United States Patent [19]

Schepers et al.

[11] 4,046,855
[45] Sept. 6, 1977

[54] METHOD FOR REMOVING HARMFUL ORGANIC COMPOUNDS FROM ALUMINATE LIQUORS OF THE BAYER PROCESS

[75] Inventors: Bernhard Schepers, Speyer (Rhine); Gerhard Bayer, Rheingonheim; Ernst Urmann, Ludwigshafen (Rhine); Klaus Schanz, Limburgerhof, all of Germany

[73] Assignee: Gebruder Giulini GmbH, Ludwigshafen (Rhine), Germany

[21] Appl. No.: 676,883

[22] Filed: Apr. 14, 1976

[30] Foreign Application Priority Data

Apr. 25, 1975   Germany .............................. 2518431

[51] Int. Cl.$^2$ .......................... C01F 7/00; C01F 7/46
[52] U.S. Cl. .................................. 423/130; 423/121; 423/119; 423/127; 423/600
[58] Field of Search ............... 423/121, 119, 127, 600, 423/130

[56] References Cited

U.S. PATENT DOCUMENTS

| 201,028   | 3/1978 | Lowig et al. | 423/121 |
| 663,167   | 4/1900 | Hall         | 423/121 |
| 2,981,600 | 4/1961 | Porter       | 423/121 |
| 3,649,185 | 3/1972 | Sato et al.  | 423/121 |
| 3,832,442 | 8/1974 | Emerson      | 423/130 |

FOREIGN PATENT DOCUMENTS

| 400,984 | 11/1933 | United Kingdom | 423/121 |
| 404,028 | 1/1934  | United Kingdom | 423/121 |

*Primary Examiner*—Herbert T. Carter
*Attorney, Agent, or Firm*—Spencer & Kaye

[57] ABSTRACT

A method is provided for removing harmful organic compounds from the aluminate liquor obtained in the production of alumina according to the Bayer process. A magnesium obtained is added to the aluminate liquor to form a hydroxide mixture containing magnesium hydroxide and aluminum hydroxide which precipitates from the aluminate liquor. The precipitated mixture is maintained in the aluminate liquor, while being stirred, until at least a part of the organic compounds have been eliminated from the aluminate liquor. The hydroxide mixture containing the organic compounds then is separated from the aluminate liquor.

10 Claims, No Drawings

METHOD FOR REMOVING HARMFUL ORGANIC COMPOUNDS FROM ALUMINATE LIQUORS OF THE BAYER PROCESS

BACKGROUND OF THE INVENTION

The present invention relates to a method for removing harmful organic compounds from the aluminate liquor obtained in the production of alumina according to the Bayer process.

The starting material for the alumina production according to the Bayer process is known to be bauxite which contains larger or smaller quantities of organic compounds depending on the source of the bauxite. The alumina is extracted from the bauxite by digesting at elevated temperature and pressure with a strong solution of caustic soda. A mixture containing the bauxite and caustic soda solution is sent to the digesters, and heated with steam. The digestion temperatures varies from approximately 200° C to 245° C, the alumina acts as an acid to form sodium aluminate in solution while impurities remain insoluble as a red mud. After the pressure digestion, the red mud is removed from the aluminate liquor as by decantation and filtration, and then the alumina is separated from the aluminate liquor by precipitation by cooling the liquor, adding seed crystals and agitating or stirring to crystalize out the alumina as a hydrate. The crystallized out alumina is separated from the aluminate liquor as by filtration, and the resulting thinned or spent aluminate liquor is concentrated as by evaporation and then recycled to be mixed with incoming bauxite in the digesters. During the evaporation, there is a foam formation in the aluminate liquor.

The major proportion of the organic compounds in the bauxite, which are mainly humic acid derivatives, is dissolved in the circulating aluminate liquor during the digestion of the bauxite with liquor. The dissolved organic compounds adversely influence in this form the various stages in the Bayer process. Due to the just-mentioned aluminate liquor circulation and recycling in the alumina manufacture, the organic compounds in the aluminate liquor may accumulate to such an extent that it is impossible to avoid malfunctions in the process sequence.

All of these observations have now led to the result that numerous experiments have been made during the last years with the aim of explaining the composition of the organic compounds contained in bauxite or in the aluminate liquor, respectively. For example, the publications by K. Solymar et al in *Freiberger Forschungshefte*, (in translation, Freiburg Research Papers), Volume 103 (1965), pages 61 to 80, and F. Matthes et al in *Chem. Techn.*, Volume 14, pages 610 to 613, illustrate such research.

The experiments resulted in a series of important realizations. For example, evaporation conditions change as a result of foam formation beginning with a certain content of organic compounds in the aluminate liquor to the extent that controlled crystallization and precipitation of foreign salts from the aluminate liquor are no longer possible. Furthermore, the concentrated thick liquor is penetrated by foam to a different extent. As a result, faulty charges are produced for the decomposition of bauxite and this leads to a worsening of the degree of decomposition. Moreover, too high a content of organic carbon compounds in the thickeners where the red mud is removed leads to a reduction in sedimentation, thus requiring larger quantities of added flocculating agent. And the organic compounds result in worsening of the crystallizing out of the alumina by stirring, and thus an often undesirable reduction in grain size of the crystallized and stirred-out hydrate.

In addition, the poorer crystallizing out and stirring effect leads to reduced product yield with respect to the stirring volume and thus to a reduction in production capacity. Furthermore, it has been noted in liquors with higher contents of organic carbon compounds that crust formation is increased, particularly in the stirrers and in the evaporation stations where the spent liquor is concentrated.

It is also known that the above-described multitudinous difficulties are not produced by the entirety of the organic compounds which are dissolved in the aluminate liquor, but substantially by a "discoloring fraction" which probably includes sodium salts and humic acid derivatives.

It is also known that part of the organic compounds is absorbed by the red mud and is removed from the circulating aluminate liquor upon the separation of the red mud from the aluminate liquor. This proportion of organic compounds that is removed with the red mud, however, is not sufficient to prevent an increase of the organic carbon level in the circulating aluminate liquor.

In order to overcome the above-described difficulties, various procedures have been proposed in the past. In most cases, however, these processes are technically too complicated or require high operating costs. Most of these processes additionally have the decisive drawback that the reduction of organic carbon is very unselective, that is, removal or decomposition of the discoloring organic compounds is achieved only in part or not at all. Thus, for example, addition of solid sodium hydroxide according to the process disclosed in Hungarian Pat. No. 146,023 results in such a high local NaOH concentration in the aluminate liquor that only partial decomposition of the discoloring organic compounds is possible and the above-described difficulties are not overcome. Other processes that have been proposed relate to chlorination of the aluminate liquor, or the introduction of ozone-containing air, that is, to an oxidation of the organic carbon compounds. The electrochemical oxidation of the aluminate liquor and the use of adsorption processes with activated carbon are further possibilities for removing the harmful organic compounds. Finally, it is possible to remove organic compounds from bauxite before decomposition by a glow treatment. For the above-mentioned reasons, however, none of the proposed processes has been realized in practice to any significant extent.

SUMMARY OF THE INVENTION

It is a primary object of the present invention to provide a process which makes it possible with low expenditures to effect selective removal of the discoloring organic substances from the aluminate liquor obtained in the production of alumina according to the Bayer process.

A further object of the invention is to provide such a process which can be practiced in large scale operation.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention, as embodied and broadly described, provides a method for removing harmful organic compounds from the aluminate liquor obtained in the production of alumina according to the Bayer process which comprises: adding a magnesium compound to the aluminate liquor to form a hydroxide mixture containing magnesium hydroxide and aluminum hydroxide which precipitates from the aluminate liquor; maintaining the precipitated mixture in the aluminate liquor, while stirring, until at least a part of the organic compounds have been eliminated from the aluminate liquor; and then separating the hydroxide mixture containing the organic compounds from the aluminate liquor.

DETAILED DESCRIPTION OF THE INVENTION

In the present invention, a magnesium compound is added to the aluminate liquor obtained in the production of alumina according to the Bayer process. Suitable magnesium compounds are all those compounds which react with the aluminate liquor to form a fine particle, gel-like mixture of magnesium hydroxide and aluminum hydroxide. These are mainly magnesium compounds, such as $MgSO_4 \cdot H_2O$, $MgSO_4 \cdot 7H_2O$, $MgCl_2 \cdot H_2O$, and $Mg(NO_3)_2 \cdot 6H_2O$.

In the practice of the present invention, if such magnesium compounds are added to a Bayer aluminate liquor which has been colored a dark red to dark brown due to its high content of dissolved organic compounds, a dark brown deposit or precipitate will form at once which has good filtration properties. After separation of this precipitate, there remains a clear aluminate liquor which, depending on the quantity of magnesium compounds added, has a yellow, in particular, honey yellow, color. Since the carbon analysis of the remaining aluminate liquor indicates that only 10 to 25% of the dissolved organic carbon compounds are removed, the lightening in color of this liquor must be considered an extremely surprising phenomenon.

After treatment in accordance with the process of the present invention, the resulting aluminate liquor exhibits a significant reduction in viscosity and foam formation during evaporation of the thinned liquor is completely eliminated. These results of the present invention are unexpected and could not be predicted. In addition, there is much less tendency toward crust formation in the stirrers when using the treated aluminate liquor and the alumina hydrate stirred-out of the treated aluminate liquor exhibits a significantly better degree of whiteness.

The discoloring organic carbon compounds discharged with the precipitate formed in the present invention can no longer be washed out with water, not even if water is used in excess. It has not as yet been determined whether the carbon compounds are physically adsorbed or chemcially sorbed to the precipitate.

The quantity of magnesium compounds used for the precipitation of the present invention depends on the content of the discoloring organic compounds in the aluminate liquor and can also be adjusted with respect to the desired degree of purity.

According to a preferred embodiment of the invention, 0.2 to 50 g/l, most preferably 2 to 20 g/l, of a magnesium compound are added to the aluminate liquor. The concentration of the aluminate liquor does not play a decisive part here. Consequently, the purification process of the present invention can be effected with the thick aluminate liquor, that is, before the foreign salts precipitation begins owing to evaporation as well as with the stirred-out spent liquor. When the magnesium compound is added to a thick liquor before the foreign salts precipitation, the resulting hydroxide mixture is separated from the aluminate liquor together with the foreign salts. The addition of magnesium salts into the thick bauxite mash liquor has also been found acceptable in practice, that is, an addition before pressure digestion. In this mode of operation, the precipitate is separated together with the red mud.

In the large scale application of the process of the present invention for the removal of the discoloring organic compounds from the Bayer aluminate liquor, the use of technical kieserite has been found particularly advantageous and advisable where the kieserite consists of approximately 97% $MgSO_4 \cdot H_2O$ and contains slight impurities in the form of sodium sulfate, potassium sulfate and/or silicic acid. The reaction rate of the kieserite in the aluminate liquor is determined by the temperature of the aluminate liquor and by the grain size of the added kieserite. The precipitate produced by the reaction, as already mentioned, essentially contains magnesium hydroxide and aluminum hydroxide in addition to adhering sodium aluminate. The stirring process during the precipitation should be continued for 5 to 60 minutes, especially for 25 to 30 minutes.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

To 100 m³ of a thick liquor having a $Na_2O$ concentration of 225 g/l, a caustic ratio of 1 $Al_2O_3$ : 3.0 $Na_2O$, and a temperature of 70° C, there were added 2 tons of technical kieserite ($MgSO_4 \cdot H_2O$). A dark brown precipitate formed and the resulting mixture was stirred for 30 minutes. After stirring for 30 minutes, the dark brown precipitate was filtered out from the liquor.

Analysis of the filtered liquor showed that 75% of the discoloring organic compounds were removed from the thick liquor by this treatment. A thick liquor has at least a concentration of 200 g $Na_2O/l$ and at least a caustic ratio of $Na_2O/Al_2O_3$ of 3,0. The thick liquor occurs after evaporation and is sent with bauxite in to the pressure digest.

EXAMPLE 2

To 500 m³ of a stirred-out aluminate liquor having a $Na_2O$ concentration of 150 g/l and a caustic ratio of 1 $Al_2O_3$ : 3.2 $Na_2O$, there were added 5 tons of kieserite ($MgSO_4 \cdot H_2O$). A dark brown precipitate formed and the resulting mixture was stirred for 30 minutes. After 30 minutes of stirring at 60° C, the dark brown precipitate was filtered out.

The discoloring organic compounds in the clear filtered liquor were analyzed. The analysis indicated a reduction of the discoloring organic compounds to 20% of the quantity present before treatment.

After the treatment, the thin liquor was evaporated in four stages in a direct current evaporation system to a $Na_2O$ concentration of 280 g/l $Na_2O$. In contrast to an untreated thin liquor, foam formation during evaporation was completely eliminated.

The dark brown precipitation residue obtained from the filtration was washed well in 70° C water, dried and heat treated at 1,000° C. The analysis of the glow residue indicated that a compound according to the formula 5 MgO . $Al_2O_3$ was present.

EXAMPLE 3

To a bauxite thick liquor mash, 1 kg/m³ of technical kieserite was added while stirring, continuously before the pressure digest stage. The resulting precipitate was filtered out after the decomposition together with the red mud. As a result of the addition of kieserite, a total of 48% of the discoloring carbon compounds were removed from the circulating aluminate liquor.

It was quite clear that the treated aluminate liquor tended much less toward crust formation in the stirrers. In addition, the alumina hydrate stirred out of the treated aluminate liquor exhibited a significantly better degree of whiteness.

It will be understood that the above description of the present invention is susceptible to various modifications, changes and adaptations, and the same are intended to be comprehended within the meaning and range of equivalents of the appended claims.

What is claimed is:

1. A method for removing harmful discoloring organic compounds from an aluminate liquor obtained in the production of alumina according to the Bayer process where bauxite is decomposed in a digester, comprising:
    a. adding a magnesium compound to the aluminate liquor, the magnesium compound being a compound which reacts with the aluminate liquor to form a hydroxide mixture containing magnesium hydroxide and aluminum hydroxide which precipitates from the aluminate liquor;
    b. maintaining the precipitated mixture in the aluminate liquor, while stirring, until at least a part of the harmful discoloring organic compounds have been eliminated from the aluminate liquor; and
    c. then separating the hydroxide mixture containing said harmful discoloring organic compounds from the aluminate liquor.

2. The method as defined in claim 1, wherein the magnesium compound is kieserite.

3. The method as defined in claim 1, wherein the magnesium compound is added in an amount of from about 0.2 to about 50 g/l.

4. The method as defined in claim 3, wherein the magnesium compound is added in an amount of from about 2 to about 20 g/l.

5. The method as defined in claim 1, wherein the magnesium compound is added to an aluminate liquor which has been concentrated and which is to be sent to the digester and the resulting hydroxide mixture is separated from the aluminate liquor together with red mud after the bauxite decomposition.

6. The method as defined in claim 1, wherein the magnesium compound is added to an aluminate liquor from which alumina hydrate has been separated out and which has been subjected to evaporation and contains salts that are to be removed by precipitation and the resulting hydroxide mixture is separated from the aluminate liquor together with said salts that are to be removed.

7. The method as defined in claim 1, wherein the magnesium compound is added to an aluminate liquor from which alumina hydrate has been separated out, and the resulting hydroxide precipitate is separated therefrom.

8. The method as defined in claim 1, wherein the magnesium compound is $MgSO_4.H_2O$, $MgSO_4.7H_2O$, $MgCl_2.H_2O$ or $Mg(NO_3)_2.6H_2O$.

9. The method as defined in claim 1, wherein from 48% to 80% of the harmful discoloring organic compounds are removed.

10. The method as defined in claim 1, wherein the magnesium compound is a water-soluble compound which reacts with the aluminate liquor to form a fine particle, gel-like mixture of magnesium hydroxide and aluminum hydroxide.

* * * * *